(12) United States Patent
Duong et al.

(10) Patent No.: US 6,487,628 B1
(45) Date of Patent: Nov. 26, 2002

(54) PERIPHERAL COMPONENT INTERFACE WITH MULTIPLE DATA CHANNELS AND REDUCED LATENCY OVER A SYSTEM AREA NETWORK

(75) Inventors: Peter H. Duong, Santa Clara, CA (US); Michael W. Knowles, Santa Clara, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/283,773

(22) Filed: Mar. 31, 1999

(51) Int. Cl.[7] ............................................... G06F 13/42
(52) U.S. Cl. ...................................... 710/313; 710/305
(58) Field of Search ................................ 710/100, 300, 710/305–315

(56) References Cited

U.S. PATENT DOCUMENTS

| | | | | |
|---|---|---|---|---|
| 6,070,200 A | * | 5/2000 | Gates et al. .................. 710/20 |
| 6,134,617 A | * | 10/2000 | Weber ......................... 710/105 |
| 6,185,620 B1 | * | 2/2001 | Weber et al. ................ 709/230 |
| 6,202,105 B1 | * | 3/2001 | Gates et al. .................. 710/20 |
| 6,279,051 B1 | * | 8/2001 | Gates et al. .................. 710/20 |

* cited by examiner

Primary Examiner—Rupal Dharia
(74) Attorney, Agent, or Firm—Oppenheimer Wolff & Donnelly LLP (57) ABSTRACT

A peripheral control interface provides access to a system area network for a plurality of peripheral devices connected to the PCI through an I/O bus. A plurality of virtual data channels is defined in local memory to which outstanding requests from peripherals are assigned. Physical channel engines implement the order requests through the assigned virtual data channel with accessed data stored in local memory. A subsequent request by a peripheral can then be immediately fulfilled from data stored in memory. Data channel context stored in memory includes the number of outstanding requests by a user to whom the channel is dedicated, and a physical channel engine can pre-fetch data in response to a plurality of outstanding requests from a peripheral thereby eliminating latency in fulfilling requests.

30 Claims, 6 Drawing Sheets

| Byte 3 | | | Byte 2 | | Byte 1 | | Byte 0 |
|---|---|---|---|---|---|---|---|
| 31\|30\|29\|28 | 27\|26\|25\|24 | 23\|22\|21\|20 | 19\|18\|17\|16 | 15\|14\|13\|12 | 11\|10\| 9 \| 8 | 7 \| 6 \| 5 \| 4 | 3 \| 2 \| 1 \| 0 |
| Write OR Ctr | Read OR Ctr | BVal Ctr | CBuf Ptr | Max PDBs | Status (12) | | |
| Start/Current Address (13) | | | | End Address (19) | | | |
| Reserved | | | D P | TNet Destination Node ID (20) | | | |
| Control (12) | | | PCI Dev# | TNet Address Translation (16) | | | |
| Reserved | | | I P | TNet Interrupt Destination Node ID (20) | | | |
| TNet Interrupt Address (32) | | | | | | | |
| Reserved | | | | | | | |
| Reserved | | | | | | | |

FIG. 9

PERIPHERAL COMPONENT INTERFACE WITH MULTIPLE DATA CHANNELS AND REDUCED LATENCY OVER A SYSTEM AREA NETWORK

BACKGROUND OF THE INVENTION

This invention relates generally to system area networks (SAN), and more particularly the invention relates to a peripheral controller in a SAN which supports multiple concurrent data channels with reduced read latency over the SAN.

Figure 1:
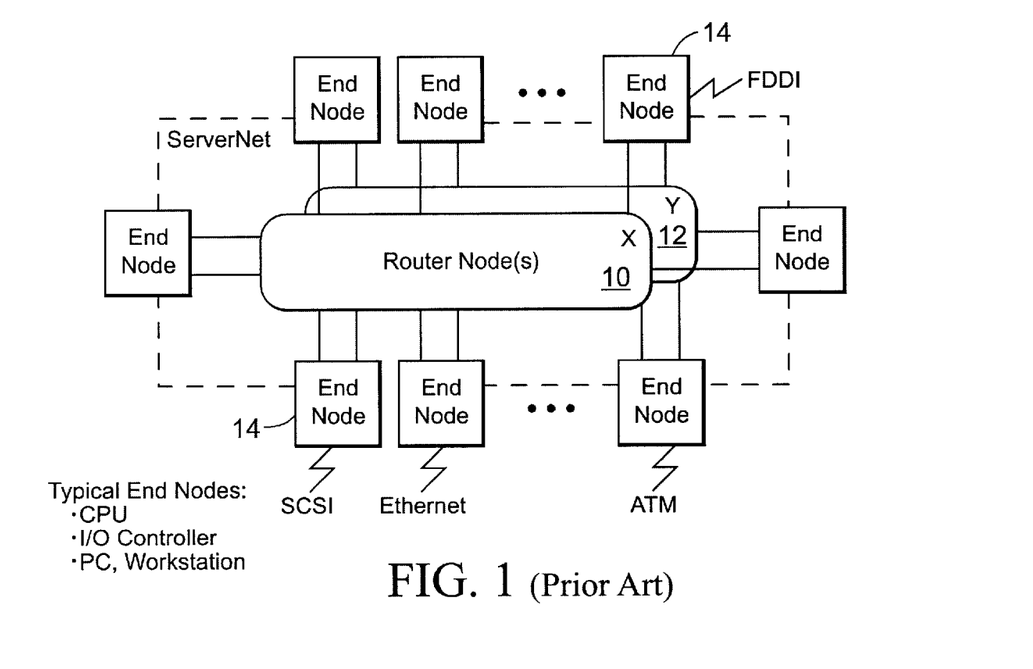
FIG. 1 is functional block diagram of a ServerNet System Area Network in which the present invention can be used.

System Area Networks using data packet switching are well known and in use today. The ServerNet of the Tandem Computer Group of Compaq Computer Corporation is a System Area Network which can employ two switch interconnect fabrics (X, Y) in a packet switch, point to point network with an address space supporting over a million end nodes where each end node can communicate directly with any other end node. FIG. 1 is a functional block diagram of the ServerNet with the two X, Y fabrics (router nodes) 10, 12, interconnecting the end nodes 14 which typically include CPUs, I/O controllers and PC work stations. While two fabrics can provide highly reliable, clustered configurations, only one fiber is architecturally required.

A plurality of peripheral components can be connected to one end node of the ServerNet through a peripheral component interface or PCI. Heretofore, a plurality of peripherals have been connected through a common bus to a PCI unit through which system Read requests from the peripherals are channeled. Typically, a peripheral given access to the bus will tie up the bus until a data request is completed. Moreover, the peripheral will remain in an idle state until the data is retrieved. Additionally, because of data limits in packet switching, a peripheral can be required to make a plurality of data requests in completing a data exchange transaction.

The present invention is directed to a PCI which supports multiple, simultaneous data channels with reduced Read latency in transactions initiated by an end node.

SUMMARY OF THE INVENTION

In accordance with the invention, a PCI connects a plurality of peripheral devices to end nodes on the system fabric through a plurality of internal independent channels. A peripheral requesting a data transaction in the network is assigned one of a plurality of PCI data channels for use in the transaction. The channel remains assigned to the peripheral until the transaction is completed. Thus, by using the plurality of channels, a plurality of data transactions can be supported simultaneously for one or more peripherals coupled to the PCI.

In accordance with the invention, latency in effecting data transactions is reduced by several features of the invention. When a Read request is received from a peripheral by the PCI, local PCI memory is first accessed for the data, and if the data is not present a channel is assigned to the peripheral for the transaction. The peripheral is then instructed to relinquish the bus and retry the request at a later time. Other peripherals can then have access to the PCI through the bus for requesting data transactions. Meanwhile, the data is requested from the network through the assigned channel, and once the data becomes available it is transferred through the assigned channel for storage in the local PCI memory.

To further reduce latency, Read transactions are scheduled ahead of time for the most recently active requestor so that Read data is already present in the local end node memory when it is being requested. Thus, Read latency over the SAN can be eliminated entirely for subsequent Read transactions thereby greatly improving overall system performance.

The invention and objects and features thereof will be more readily apparent from the following detailed description and appended claims when taken with the drawings.

DETAILED DESCRIPTION OF ILLUSTRATIVE EMBODIMENTS

The invention has been implemented in a peripheral component interface designated Colorado, and this description will be of the Colorado embodiment.

Figure 2:
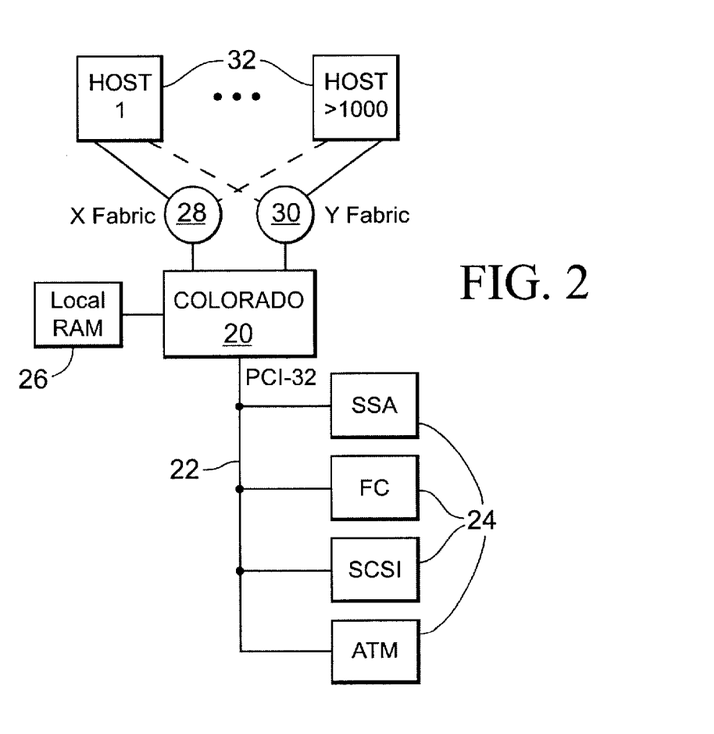
FIGS. 2, 3, and 4 are functional block diagrams of a PCI in accordance with the invention functioning in a SAN.
Figure 3:
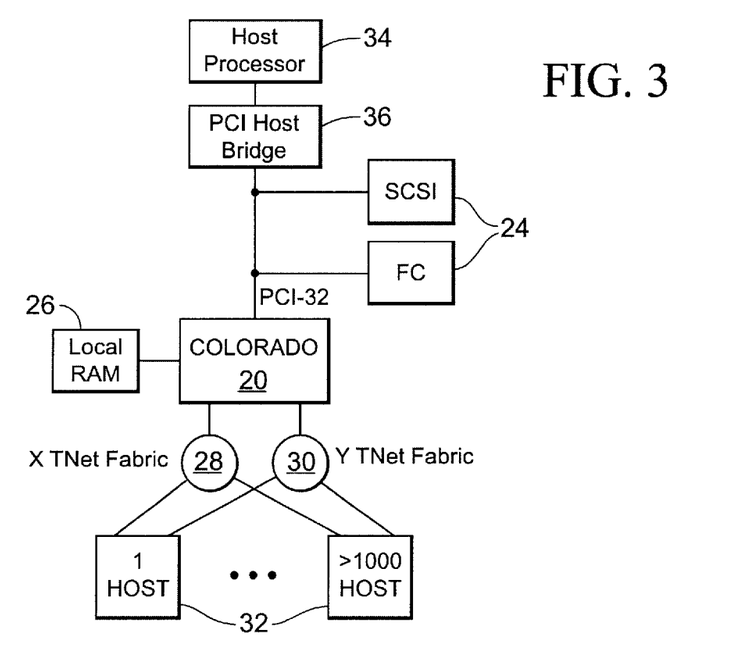
Figure 4:
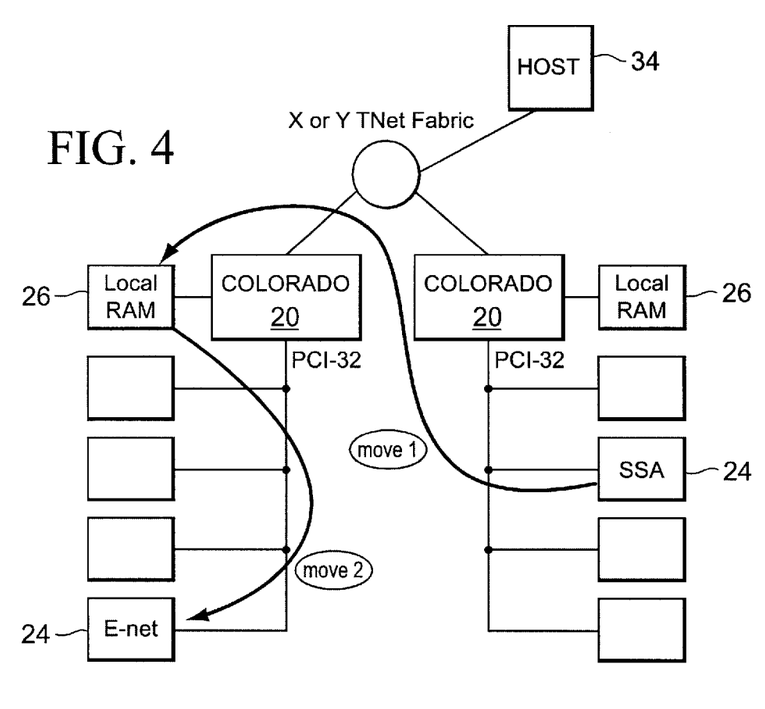

FIGS. 2, 3, and 4 illustrate functional applications of the Colorado PCI in a ServerNet SAN. FIG. 2 illustrates Colorado in a ServerNet I/O to host bridge configuration. The PCI 20 has a bus 22 coupled to peripherals 24 which can each be compatible with different formats. (e.g. SSA, FC, SCSI, ATM.). A local RAM memory 26 is coupled to PCI 20 for facilitating data transfers through an X fabric 28 and a Y fabric 30 to a plurality of hosts 32. The limit on the number of supported hosts is based on memory limitations associated with the system design and the amount of memory 26 devoted to access validation and translation. As will be described, the number of concurrent I/O streams or channels available for simultaneous transactions is based upon the amount of local RAM 26 allocated to the data channel mechanism.

The data channel mechanism provides the local PCI bus with windows of addressing into all of the attached hosts address space. These virtual windows or data channels come in 512 byte chunks. Each channel has a data channel engine, and the function of the data channel engine is to direct PCI device access to a ServerNet node, mapping the address provided on the PCI bus to a ServerNet address for the appropriate node. Access from other ServerNet nodes to PCI space does not go through the data channel address range. When a PCI device initiates a PCI write to a data channel, the data channel engine directs that write to the appropriate ServerNet node. When a PCI device initiates a PCI read from a data channel, the channel engine pre-fetches data such that PCI read request data is already in the local RAM when the next PCI read request is initiated. Thus Colorado can be used as a high performance ServerNet I/O to host bridge.

FIG. 3 is a functional block diagram of the Colorado PCI 20 as a host to ServerNet bridge. In this embodiment host computer 34 through PCI host bridge 36 is connected to the X and Y fabrics 28, 30 through Colorado PCI 20. The local host 34 uses the Colorado access validation and translation unit (AVT) as a mechanism to allow other ServerNet nodes access to its address space (this mechanism will be later described). A block transfer engine (BTE) of the PCI is used to transfer data to and from other nodes. The AVT unit shields the PCI local RAM and PCI address space from unauthorized ServerNet access. The local host 34 sets up AVT entries in the Colorado local RAM, and these entries control which ServerNet nodes may access what memory space attached to Colorado. The AVT also translates the virtual ServerNet address so tat multiple virtual ServerNet memory pages can be mapped to the same Colorado physical address space. The block transfer engine (BTE) is essentially a ServerNet DMA controller. The host places a transfer descriptor in Colorado local RAM and enables the BTE. The BTE fetches the descriptor and carries out the transfer which is specified. This may be ServerNet Read or Write and it may be either the X or Y ServerNet domain. The descriptor format provides a chain pointer which may be used to link many descriptors together for the BTE to then execute in sequence.

FIG. 4 is a functional block diagram of the use of two Colorado PCI units 20 functioning as an I/O to I/O bridge. In this application a wide variety of design options is available. For example, the I/O controller which sources the data uses a data channel, much as in the I/O to ServerNet host configuration. The data channel is targeted at the local RAM of another I/O sub-system. The controlling host 34 is responsible for setting up the data channel in the sourcing system (Move 1), and the AVT unit in the receiving system (Move 2). When the data block transfer from the sourcing I/O device is complete, that device notifies the controlling host that the data is ready for the second I/O device to begin its processing. This mechanism relies on a store-and-forward approach. A store-and-forward architecture is typically required due to speed mismatches between I/O devices; however, store-and-forward is not a requirement imposed by the Colorado PCI.

Figure 5:
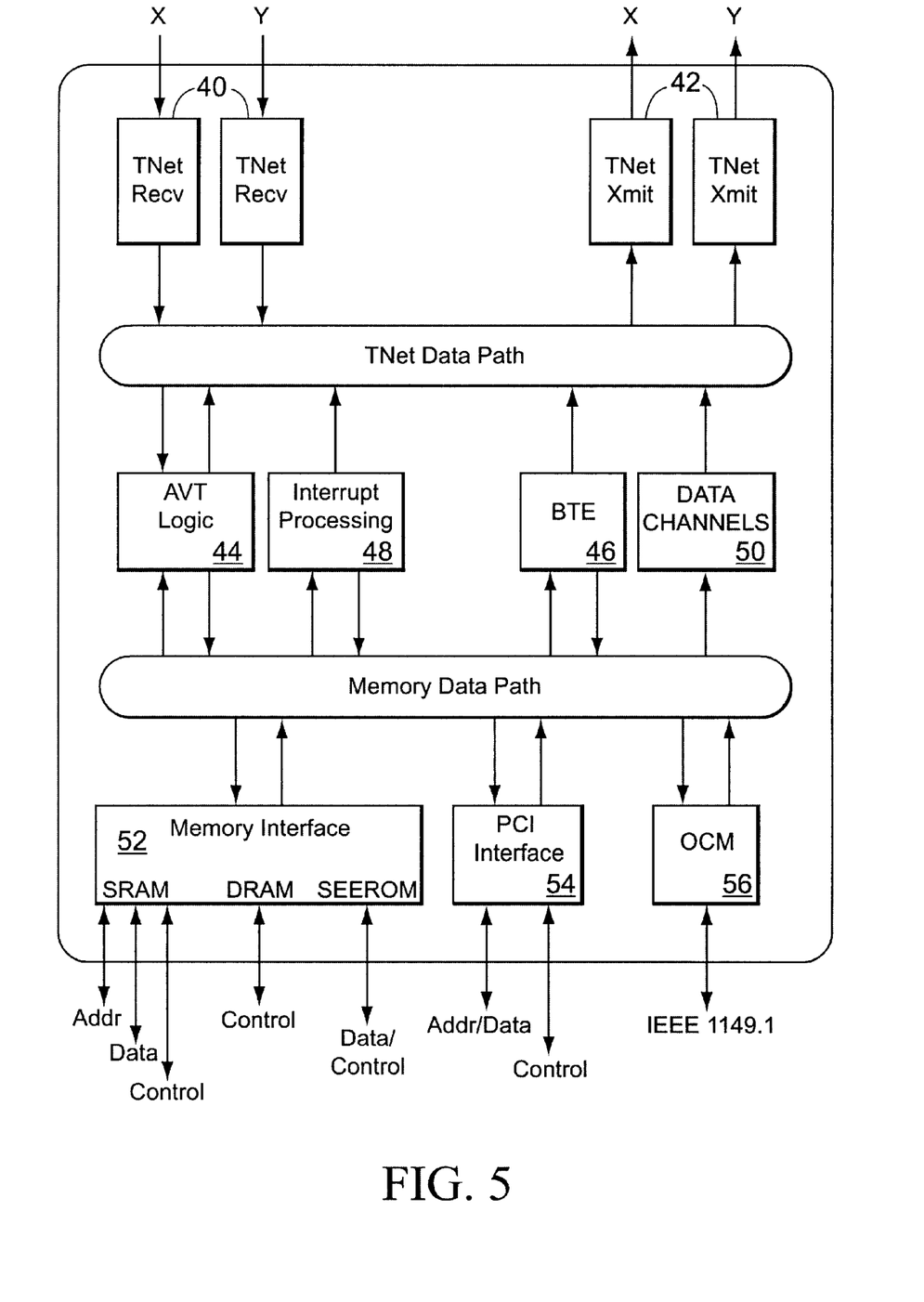
FIG. 5 is a functional block diagram of a PCI in accordance with one embodiment of the invention.

FIG. 5 is a functional block diagram of the Colorado PCI. The PCI 20 provides several important functions. Dual X, Y ServerNet ports 40 & 42 are provided whereby Colorado can perform simultaneous data transfer on both X and Y TNet ports and in both directions concurrently for optimal performance and fault tolerance. Access validation and translation (AVT) 44 is provided for maximum flexibility in verifying incoming requests and node to node data exchange. Up to 4096 virtual data channels are available to support DMA data transfer between TNet and PCI by intelligent PCI device controllers with built-in DMA engines. The Colorado data channels 50 can be programmed from both the TNet and PCI side and do not require a local microprocessor. The number of data channels 50 is configurable. A single channel block transfer engine (BTE) 46 is available to support applications in which DMA capability is not available in the PCI devices. Colorado's BTE 46 can transfer data to and from the X or Y TNet ports 40 & 42. For maximum performance and flexibility, the Colorado BTE 46 features chained descriptor capability and can be programmed from both the TNet and the PCI side.

Five external interfaces are provided. The TNet interfaces provides dual X, Y ports which can simultaneously transfer and receive. A PCI interface provides fully compliant 33 MHz/32 bit local I/O bus with integrated bus arbiter. Up to six devices are supported on the PCI bus without the need for an external arbiter. A memory interface provides 62 MHz/64 bit, ECC protected memory interface which can support synchronous SRAM devices directly and interface for external DRAM controllers. A SEEROM interface is a 4 wire interface to external SEERAM which can optionally be used to store some of the configuration information. A service processor (SP) interface provides an interface via the IEE 1149.1 serial bus.

Looking more particularly at each functional element, the TNet interface handles all TNet transactions designated for Colorado from other TNet nodes and TNet transactions generated by Colorado destined for other TNet nodes. The TNet received block 40 buffers inbound TNet requests (X, Y) and responses from the TNet received port. It checks and converts the encoded bytes streamed from the TNet received link to packet format to be processed by the AVT. The TNet transmit 42 buffers outbound requests generated by the BTEs, data channels, and outbound responses created by the AVT. It checks and converts the packet data to the encoded bytes stream before sending it out to the TNet transmit link. Packets can be sent out to either X or Y transmit ports, depending upon the path bit value and the packet's header field.

The access validation and translation (AVT) unit 44 processes all incoming TNet requests to Colorado. The AVT performs access validation and address translation, interrupt packet Q processing, TNet packet layer error reporting, and response generation for TNet request packets. Colorado provides address translation and access validation for received TNet request packets. The TNet addresses contained in request packets are translated to physical memory addresses and access permissions are validated before the request is executed. The translation and validation information is stored in the access validation and translation table in memory. The table entries are 8 bytes in length and the table can be as small as a single 4 k byte page which provides 512 translation table entries (2048 k bytes of address space). If more than one node is permitted access to a specific physical page, the AVT table must have one entry for each node accessing that page.

The block transfer engine (BTE) 46 provides a programmable mechanism for generating TNet transactions. These transactions can address any TNet node in the system, including the requesting node. The BTE generates TNet requests, times of transactions, and completes the transaction when the expected response packet is received. TNet transaction types generated by the BTE include read, write, unacknowledged write, barrier, and diagnostic transmits. The BTE consists of a control and status register with an associated lock mechanism, located in the Colorado, and a link list of BTE descriptors. For maximum flexibility, the BTE can be programmed for operation from both TNet and PCI side.

The interrupt processing unit 48 generates interrupt packets to the TNet, processes interrupts from the TNet, processes interrupts received from the PCI bus, generates interrupts to the PCI bus, and generates interrupts to the Service Processor.

Figure 8:
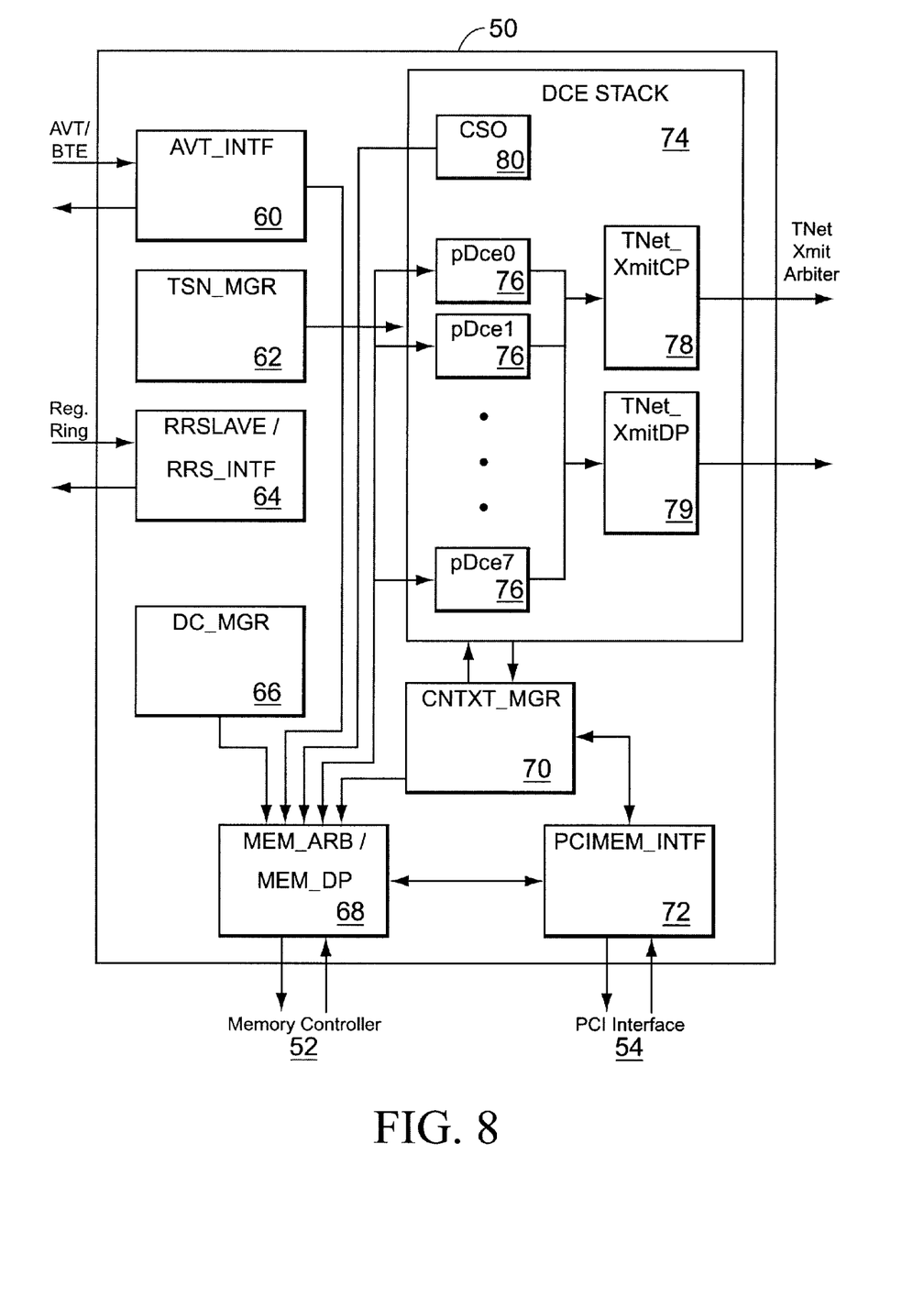
FIG. 8 is a functional block diagram of a data channel engine (DCE) in the PCI of FIG. 5.

Data channel engines 50 (as illustrated in FIG. 8) provide another programmable mechanism for generating TNet transactions. These transactions can address any TNet node in the system. Unlike the BTE, the data channel engines do not contain a DMA engine but rather provide virtual connections, virtual data channels, for PCI device-initiated DMA streams to or from TNet host memory. The data channel engine logic is designed to take advantage of the DMA capability of intelligent PCI peripheral device controllers and network controllers. The data channel engine logic can generate read and write TNet transactions, and each separate DMA stream is assigned an individual virtual data channel which must be allocated and properly programmed before a read or write DMA transfer can begin. In order to meet the need of applications in which thousands of data channels might be necessary, the Colorado PCI has the capability to support a very large number of channels. Colorado has a set of physical channels whose contacts can be switched in from and out to external memory upon demand. Virtual data channels are also employed with contacts stored in the Colorado local RAM.

When a PCI DMA read is requested, a read request packet must be built, and then sent to the destination TNet node. In the prior art, the requester waits the entire TNet round trip delay plus host processing time before the response packet arrives. As a result, TNet read performance is poor.

In order to avoid the TNet round trip delay incurred every time a read request is made, in accordance with the invention Colorado employs a read pre-fetch engine (RPE) in every data channel. The RPE generates read request packets to the destination TNet node as long as there are available outstanding requests (ORs) and buffer resources allocated to it. The pre-fetched response packets, when received, are stored in the pre-fetch data buffers (PDB) located in Colorado's local RAM. The pre-fetched packets are held until retrieved by the requesting device. The RPE and its PDB function as a NTet memory cache.

A data channel must be programmed with the proper context to enable operation. A Data Channel Context (DCC) contains all pertinent information for the read pre-fetch operation.

Since each DMA stream is assigned its own data channel, Colorado must have a mechanism to distinguish among the different channels. The mechanism is to assign a number to each data channel. The channel number is embedded in the PCI address presented to Colorado during DMA operations initiated by PCI devices.

Colorado may use up to twelve high-order bits (30–19) in the PCI address field to address its data channels.

Figure 6:
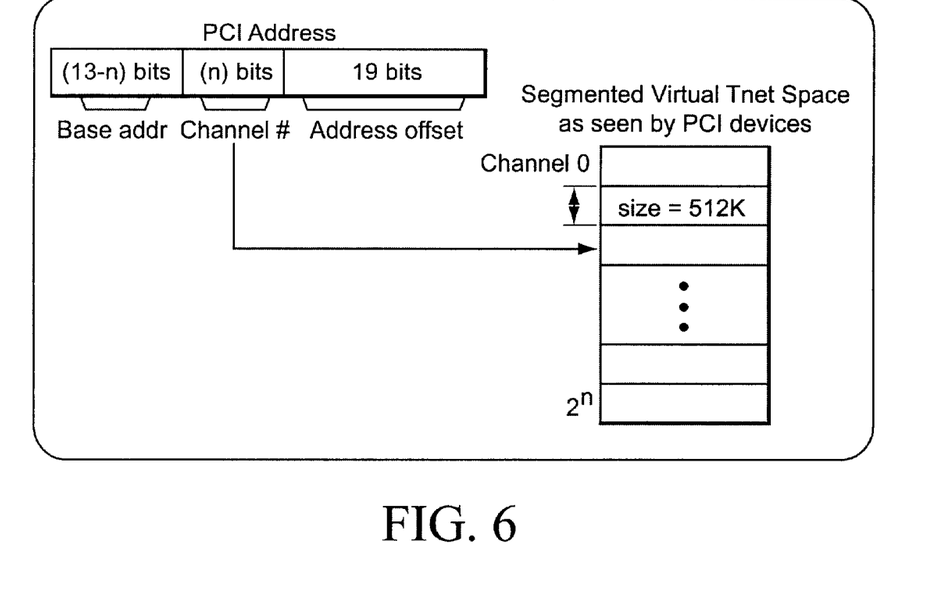
FIG. 6 is a functional block diagram illustrating data channel addressing in the PCI of FIG. 5.

By utilizing twelve bits in the PCI address field, one-half of the address space is effectively divided into $2^{12}$ (4096) segments of size equal to $2^{(31-12)}$ (512K) as shown in FIG. 6. Each segment represents a data channel with a 512 k byte (fixed-size) virtual buffer in the TNet address space as seen by PCI devices.

The data channel allocation logic is responsible for allocating an available channel to a requester. All available channels are kept in a queue. When a channel is requested, it is removed from the queue and when a channel becomes available, it is added back to this queue.

A data channel can be requested by reading the Data Channel Request (DCR) register in Colorado. The DCR register contains the 12-bit address of an available channel. The channel request could be originated on the TNet side or the PCI side. Whichever side makes the channel request is responsible for programming that data channel with the appropriate context information, and de-allocating that channel when the transfer is completed. The de-allocation can be done by writing the address of the channel to be de-allocated to the Data Channel De-allocation (DCD) register.

Figure 7:
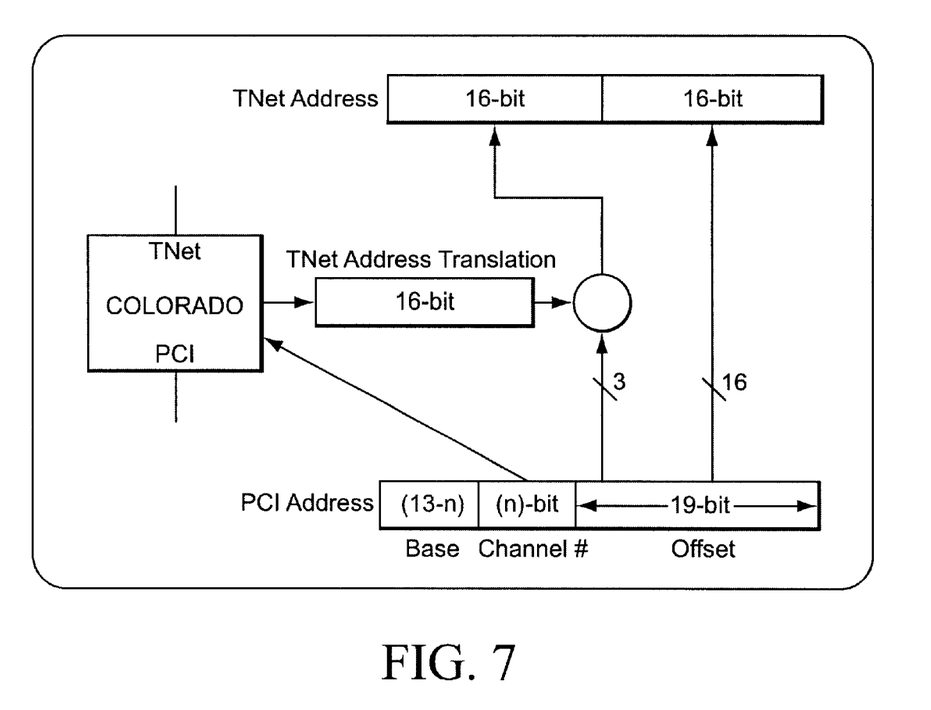
FIG. 7 is a functional block diagram illustrating PCI-SAN address translation.

Once granted a data channel, a PCI device controller would program its own DMA engine(s) to perform data transfer utilizing the Colorado's virtual buffer address to access TNet space. To do this, the virtual buffer address needs to be mapped to form the actual TNet address in order to access the destination TNet node, as illustrated in FIG. 7.

Colorado's data channel logic performs the address mapping using the Address Translation field which is part of a data channel context.

Colorado's synchronous memory interface 52 operates at 50-MHz. The data bus is 64-bits wide with 8-bit ECC protection and the address bus is 25 bits wide, capable of addressing 4 MB of synchronous SRAM and 256 MB of DRAM. The memory interface can support synchronous SRAM directly and has an interface to an external DRAM controller.

Running zero-wait state memory transactions at 50-MHz places a very stringent loading restriction on the memory bus. As a result, SRAM-only memory capacity is limited to 4 Mbytes. The external DRAM controller interface is provided primarily for capacity expansion in systems which require large amount of memory buffering. System designers can choose to use SRAM and/or DRAM devices as long as the bus loading requirement is not exceeded.

Colorado's PCI interface 54 operates at 32-bit, 25 MHZ with PCI-Compliant 3.3V I/O drivers with 5V tolerance capability. PCI Configuration can be done from both TNet and PCI with PCI interrupt generation, and integrated PCI bus arbiter which can support up to 6 devices. The integrated Interrupt Controller which can support up to 6 interrupt request lines.

Colorado has a 4-wire interface to an external SEEROM within memory interface 52. The SEEROM is used to store configuration information which is loaded into the Colorado's ASIC at power-up. Use of the external SEEROM is optional.

The On Chip Monitor (OCM) 56 provides a diagnostic interface between Colorado and a Service Processor (SP) in those applications that include an SP. The OCM interface can be used to do Colorado initialization after power on, running built in self test, and reading or writing Colorado registers.

FIG. 8 is a functional block diagram of a data channel engine as used in each of the data channels 50 of FIG. 5. The addressing of end nodes in the system and the accessing of data is through one of the data channels which is assigned to a peripheral device. As will be described in more detail, the stack includes 8 physical data channels PDC with the status of the data channels controlled by a context manager.

The AVT Interface 60 has two functions: process DCE responses, and maintain context coherency during AVT context accesses. A response is processed by determining which data channel used the corresponding TSN. A response is process differently depending on the current location of the data channel. If the data channel is in memory, the Context Update Engine (CUE) reads the context from memory, modifies the appropriate bits, and writes the context back to memory. If the context is in a physical data channel engine (pDCE), the response is sent to the TNet response state machine (TNetRspSM), located within the corresponding pDCE, for processing. AVT context accesses require context to be in memory. Therefore, the AVT interface determines the location of the requested context. If the requested context is in a pDCE, the AVT_INTF requests that the context be switched out. If the context is in the CUE or CSO, the AVT_INTF waits for the context to be returned to memory. Once the requested context is in memory the AVT Interface returns a signal (DCE_AVT_CntxtSwDone_QO), indicating that the AVT can access context.

The TSN Manager 62 has two functions: maintain all DCE TSN information, and TSN allocation for the DCE and Interrupt Manager (IMGR). The TSN Manager maintains TSN information. This information is held in registers, which can be accessed by the register ring 64. Allocation of TSNs are handled based on a priority scale as follows:

1) interrupt 9IMGR)
2) TNet Writes
3) Preemptive Reads
4) Normal Reads

For multiple requests of the same priority, a round robin arbitration scheme is used.

This register ring block 64 includes two modules: Register Ring Slav and Register Ring Slave Interface. The Register Ring Slave (RRSlave) is a standard module used in various parts of Colorado. For more information see the Register Ring spec. The Register Ring Slave Interface (RRS_Intf) is the interface that decodes the Register Ring address and processes any accesses to the DCE registers.

The DC Manager 66 maintains all DC allocation information (allocation map, allocation/deallocation requests, and allocation map coherency). The DC Manager contains a 64 bit cache page of the allocation map. Each bit in this page is a data channel, where a 1 indicates the dc has been allocated and a 0 indicates not allocated.

The Memory Arbiter and Data Path 68 are the interface to the Memory Block. The Memory Data Path is several muxes used to choose the correct address, data and control signals from the granted block. The Memory Arbiter has five request lines to arbitrate: PCIMemIntfReq_1, CntxtMgrMemReq_1, CUEMemReq_1, and DeMgrMemReq_1. The arbitration has the following priority:

1) PCI or CNTXT_MGR
2) CSO
3) CUE
4) DC_MGR

The Context Manager 70 has three functions: preprocessing of PCI Data Channel requests, prefetch buffer access management, and context access management.

The preprocessing needed for a Data Channel requests is: verifying that the DC requested is in a pDCE (if not, CNTXT_MGR supervises the loading of it), verify that the request and device are a valid and the read data is in PDB, where applicable. Prefetch buffer accesses are requested by PCI when requesting a read from TNet and the data exists in the PDB. The context manager first does the typical preprocessing, as described above. Then, the context manager requests the data from memory and passes it along to PCI. Cache coherency needs to be maintained during context accesses. If the context is being used by a pDCE, the context manager handles context accesses depending on the type of request:

Read Requests: writes out the context, but does not unload the pDCE.

Write Requests: unloads the pDCE.

The DCE acts as a bridge from PCI to Colorado local memory. The PCI Memory Interface 72 handles the majority of this functionality by providing an access path and a read data pate from PCI to Colorado local memory.

The DCE Stack 74 function is to perform the PCI to TNet request (read or write) by translating and compiling the request and sending it to the TNet Transmit Buffer. The Stack consists of several physical Data Channel Engines 76, Xmit arbiter interface logic 78, and a Context Switch Out engine 80.

The Context Switch Out (CSO) block 80 is a temporary buffer that holds the context that is being switched out. When a context is switched out, it must first go through the CSO. For an example of the CSO usage, suppose pDCE1 is going to be used by DC2, but DC3 context is currently in pDCE1. DC3 context will be moved into the CSO; DC2 context will be moved into pDCE1 and the CSO will write DC3 context to memory once DC2 context is loaded into the pDCE.

There are 8 physical data channel engines. These engines are the blocks that store the context and process the PCI to TNet request. The processing done by the pDCE is involved and described in great detail in the external spec.

The DCE 50 sends the TNet requests to the transmit buffer arbiter using the TNetXmitCP 78 and TNetXmitDP 79, control and data paths, respectively. Basically, these blocks are 8 to 1 muxes that pass the corresponding signals or data from the pDCE that is granted to the transmit buffer.

Figure 9:
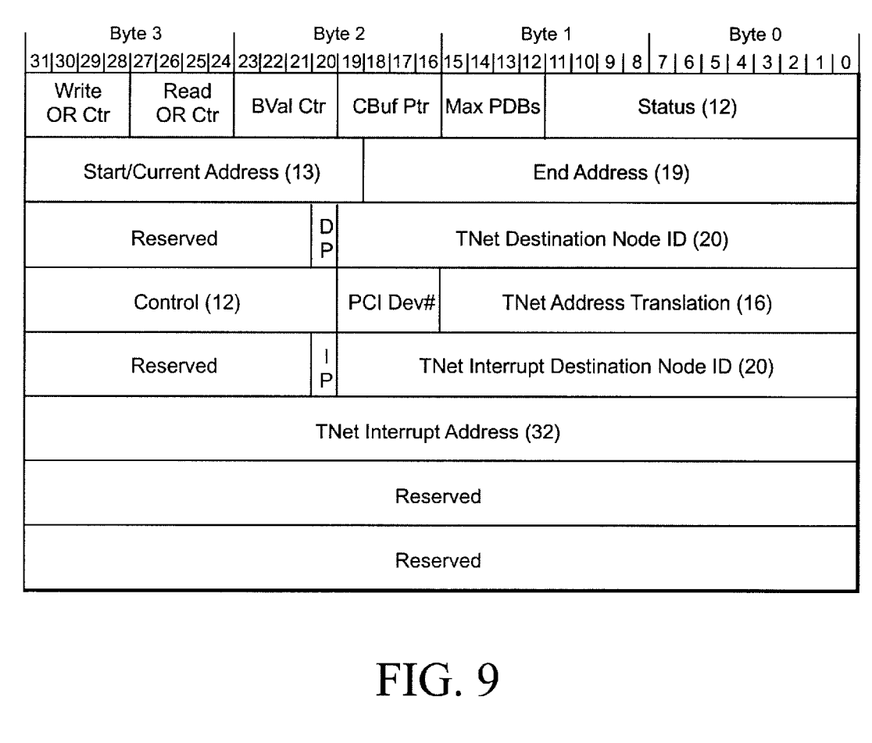
FIG. 9 is a layout of a data channel context for controlling a data channel.

The Context Manager maintains control of the physical data channels through a data channel context which contains all control/data information for a particular data channel. DCC for all channels are maintained by Colorado in external memory, the DCCs may be programmed from either TNet or PCI side. FIG. 9 is the format of a Data Channel Context (DCC) as stored in memory. The Data Channel Context (DCC) contains all control/status information for a particular data channel. DCCs for all channels are maintained by Colorado in external memory. DCCs may be programmed from either TNet or PCI side.

The base location of the DCCs in Colorado external memory is configured through the Data Channel Context Base Address register. DCC external memory in Colorado is arranged as an array of DCC entries from zero to the maximum number of data channels supported by Colorado, with a direct relationship between DCC number and data channel number (i.e. DCC #m corresponds to data channel #m).

Each DCC is 32 bytes long. Colorado can support a maximum of 4096 data channels; therefore, up to 128K bits of external memory is required by Colorado to hold DCC entries. The base address of the DCCs must be naturally aligned to the amount of memory required for all DCC entries (for example, for 32 data channels, the DCC base address must be aligned on a 1K boundary within Colorado external memory).

To access the DCC for a specific data channel, a Colorado memory address is constructed from the Data Channel Context Base Address register contents and the data channel number as follows:

| DCC Base Address | Channel # | Offset |
| --- | --- | --- |
| 15-bit | 12-bit | 5-bit |

DCC entries can be accessed from TNet or from the PCI bus. When accessed from TNet, DCC entries are byte-addressable. The 5-bit offset field may contain any value from 0 through 31. When accessed from the PCI bus, DCC entries are word-addressable only (the Offset field is constrained to multiples of four); however, individual bytes may be read or written using the PCI byte enable mechanism.

A data channel context as shown in FIG. 9 consists of the following fields:

Write Outstanding Request (WOR) Counter

This four-bit field counts the number of TNet Write requests currently outstanding for the data channel.

Read Outstanding Request (ROR) Counter

This four-bit field counts the number of TNet Read requests currently outstanding for the data channel.

Buffers Valid (BVal) Counter

This four-bit field counts the number of read pre-fetch buffers which currently contain valid ore-fetch data for this data channel. This field is used by Colorado's data channel logic to control the read pre-fetch engines.

Current Buffer (CBuf) Pointer

This four-bit field contains the Current Buffer Pointer which is used to address a data channel's pre-fetched data buffers (PDBs). The CBuf pointer normally points to the first valid buffer. A valid buffer is defined to be a buffer which contains a pre-fetched read response packet.

The CBuf pointer is moved to the next valid buffer after the current one is read. After the data in a valid buffer is read, the contents of that buffer are invalidated and that buffer becomes available for subsequent pre-fetch read requests.

Maximum Pre-Fetch Data Buffers (Max PDBs)

This field should be programmed to the desired value during data channel initialization. By varying the maximum number of PDBs utilized on a per-channel basis (giving higher-bandwidth data channels a larger number of PDBs utilized than lower-bandwidth channels), Colorado's read pre-fetch bandwidth can be maximized.

Note that the value specified the maximum number of PDBs used by a data channel can not exceed the number of data buffers allocated per data channel. If a value exceeding the number of PDBs allocated is specified in this field, the data channel will be disabled with the CPE (Context Programming Error) bit set in the Status field of the DCC.

Status

This twelve-bit field contains the data channel's status and has the following format:

| 11 | 10   | 9          | 8   | 7    | 6   | 5    | 4   | 3    | 2    | 1   | 0    |
|----|------|------------|-----|------|-----|------|-----|------|------|-----|------|
| RO | Rsvd | SEQ ERR    | ATO | PERR | DO  | NACK | CPE | IERR | AERR | NIC | COMP |

| Bit | Symbol | Description |
|-----|--------|-------------|
| 11  | RO     | Requests Outstanding-Set to 1 if there are outstanding Write, Read or Invalid Read requests. The Invalid Read Outstanding Request (IROR) field is not stored in the DCC, but exists for handling outstanding read requests which are invalid. An outstanding read request becomes invalid wen it is skipped over or any subsequent prefetched read data. |
| 10  | Rsvd   | Reserved for future use. |
| 9   | SEQ ERR | Sequence Error-Indicates out-of-order, pre-fetched read responses from TNet have been received by Colorado. The data channel is disabled once a sequence error is detected. |
| 8   | ATO    | All TSNs Timed-Out-Set to 1 when a data channel is accessed while all TSNs, available for DCE, use had timed out. Note that ATO doesn't disable the data channel. |
| 7   | PERR   | Data Channel PCI Parity Error-Indicates that Colorado detected a PCI parity error on write data for this data channel. |
| 6   | DTO    | Data Channel Timed-out-Set to 1 when the TSN timer expires. The TSN timer is started when a request is sent from Colorado. |
| 5   | NACK   | NACK-Set to 1 if a NACK to a data channel TNet request is received by Colorado. |
| 4   | CPE    | Context Programming Error-Set to 1 if the Max PDBs field (in DCC) is programmed with a value greater than the Number of Buffers per Data Channel field in the Data Channel Configuration Register. This error is only detected during TNet reads. |
| 3   | IERR   | Interrupt Error-Set to 1 if data channel is in Serialized Interrupt mode and a write to the channel was not delivered to TNet due to a request time-out condition. |
| 2   | AERR   | Access Error-Set to 1 if data channel (when accessed) detects any of the following conditions: 1) Data Channel is disabled (Bit DCE, in the DCC's control field, has a 0 value) 2) Data channel is in an Error state (i.e. any of the error bits in its DCC's Status field is set). 3) The PCI device currently accessing the data channel does not have the same value as the one programmed in the DCC's PCI Device Number field. 4) Data Channel is configured in Interrupt or Serialized Interrupt mode and is accessed to send read requests. |
| 1   | NIC    | No Interrupt Credit-Set to 1 if data channel is in Interrupt or Serialized Interrupt mode and a write to the channel is attempted while the GWIC register is zero. |
| 0   | COMP.  | Data Channel Transfer Complete-Set to 1 when the End Address of a data channel transfer is reached AND the last TNet Write Acknowledge has been received AND End Address checking is enabled (i.e. bit TECD = 0 in the Control field on the DCC). Note that the data channel will be disabled once the COMP bit is set. The COMP bit is not used at all during TNet reads since the data channel has no knowledge of when the PCI device has read the last of data it had requested. |

This four-bit field indicates the maximum number of read pre-fetch data buffers (PDBs) that this data channel can utilize at any given time. Values of 1 through 15 for this field indicate a maximum of 1 through 15 PDBs utilized, while a value of zero for this field indicates that no read pre-fetches should be performed for this data channel.

Start/Current Address

This field is used by Colorado to track the current location of a data channel transfer within that channel's virtual TNet address space. Initially, this field is programmed with bits 18:6 of the starting virtual TNet address for a channel data transfer before the transfer is initiated. After transfer initiation, the most recent 64-byte 'page' within the channel's virtual TNet space (given by address bits 18:6 of each PCI access) is stored in this field by Colorado. Note that this field is only meaningful when the data channel is used to read TNet data.

End Address

This 19-bit field is programmed with the end address of the current DMA transfer (offset from the beginning of the data channel). The use of this field by Colorado data channel interrupt logic is controlled by the Transfer End Check Disable (TECD) bit in the Control field of the context.

For TNet reads, if TECD=0, the End address field is ONLY used to signal the RPE to stop generating read requests. When the current pre-fetch TNet destination address matches the end Address field, the RPE stops sending any more read requests.

For TNet writes, if TECD=0, Colorado verifies that write accesses to the channel by a PCI device do not extend beyond the programmed End Address. The data channel user must exercise caution to avoid writing beyond the programmed End Address since DCE logic can only detect the end condition of a TNet write after PCI has sent all the data. What this means is the last write request that exceeds the End Address WILL be sent out to TNet.

If TECD=1, the End Address field is ignored by Colorado data channel logic; this address is not used to stop pre-fetches by the RPE, and is not used to signal data transfer completion, allowing use of a data channel as a 'buffer pool' for comm applications. Again, the data channel user must exercise extreme caution to avoid crossing over the maximum 512K boundary of the virtual TNet buffer.

TNet Destination Path Select (DP)

This single-bit field selects between the X (DP=0) and Y (DP=1) TNet paths to the specified destination TNet node for data transfers using this data channel.

TNet Destination Node ID

This field contains the 20-bit destination ID of the TNet node for data transfers using this data channel.

Control

This twelve-bit field contains the Data Channel information and has the following format:

| 11 | 10 7 | 6 | 5 | 4 | 3 | 2 1 | 0 |
|---|---|---|---|---|---|---|---|
| Rsvd | TNet TO (4) | PRE | TECD | PAC | IFMT | Mode (2) | DCE |

Net TimeOut—This four-bit encoded field indicates the TNet timeout value to be used by Colorado's TNet Stack hardware. This field specifies the number of clock ticks with each tick equaling 163.84 us.

Preemptive Priority—When set to 1, the data channel is granted higher priority to generate TNet read requests for pre-fetches than channels with this bit set to zero. Default setting is 0.

Transfer End Check Disable—When TECD=1, the End Address field of the data channel context is not used by data channel logic for transfer completion or pre-fetch termination. Caution: For TNet reads, prefetch could extend into the next data channel's virtual buffer space.

PCI Access Check—when PAC=1 and Colorado is acting as the arbiter for the PCI bus, the PCI device accessing this data channel will be validated against the PCI Device Number field in the data channel context; accesses by unexpected devices will be disallowed. When PAC=0, PCI device validation for the data channel is disabled. Default Setting is 0.

Interrupt Format—Indicates the format in which data channel generated interrupts will be reported. If IFMT=0, data channel interrupts will result in the generation of TNet interrupt packets. If IFMT=1, data channel interrupts will result in the creation of an entry on Colorado's Data Channel Interrupt Queue. Default setting is 0.

Data Channel Mode.—This two-bit field indicates the mode of operation for the data channel:

bits [2:1]=00: Data mode (default)

bits [2.1]=10 Reserved

Data Channel Enable—When set to 1, the data channel is ENABLED for PCI device access. Default setting is zero (data channel is disabled).

PCI Device Number

This four-bit field contains the encoded device number of a physical PCI device situated on Colorado's PCI bus. If Colorado is configured as a PCI bus arbiter and the PCI Access Check (PAC) bit is a one in the Control field of the DCC. Colorado will use this field to verify that only the PCI device intended to use this data channel is accessing the channel.

If an external PCI arbiter is being used (Colorado is not the PCI bus arbiter) or the PCI Access Check (PAC) bit is a zero in the data channel's Control field, the PCI Device Number field is not used by Colorado data channel logic.

TNet Address Translation

This field contains the 16-bit address translation used to map a data channel's virtual TNet address to an actual TNet address (see Section 13.1, Data Channel Mechanism for details).

TNet Interrupt Destination Path Select (IP)

This single-bit field selects between the X (IP=0) and Y (IP=1) TNet paths to the specified destination TNet node for data channel-generated TNet interrupt packets.

TNet Interrupt Destination Node ID

This field contains the 20-bit destination ID of the TNet node to which data channel-generated TNet interrupt packets are to be sent by Colorado.

TNet Interrupt Address

This field contains the 32-bit TNet interrupt address for data channel-generated TNet interrupt packets sent by Colorado.

Data Channel Modes of Operation

Colorado data channels have three modes of operation: Data, Interrupt, and Serialized Interrupt. The latter two modes are used for sending generic write interrupts from PCI devices to TNet hosts. The mode of operation for each data channel is selected by setting the Mode bits in the Control field of the channel's DCC (see Section 13.3.3.12, Control).

Data mode is the standard (and default) operating mode for the data channels. In this operating mode, it is assumed that all PCI reads/writes through the data channel are to normal AVT entries in the destination TNet node. All PCI read and write addresses are converted to TNet addresses and TNet read/write requests are generated to the TNet node specified in the TNet Destination Node ID field of the channel's DCC.

When a data channel is in Data mode, interrupt packets are generated for the data channel only when the IFMT bit in the control field of the channel's DCC is set to zero (indicating TNet interrupt packets are to be generated in response to data channel interrupt conditions) and an enabled interrupt condition (as specified in the Interrupt Enable field of the DCC) occurs. In this case, the TNet Interrupt Destination ID and TNet Interrupt Address fields are used to indicate the destination node and TNet address for the interrupt packet.

PCI devices may generate TNet interrupt packets through a data channel by performing standard TNet Write operations mapped to AVT interrupt entries in the destination node. Since AVT interrupt entries map to a specific interrupt queue of static length in the destination node's memory space, it is necessary to provide a mechanism to prevent the PCI devices attached to a Colorado from flooding an interrupt queue (or multiple interrupt queues) with interrupt packets.

Colorado implements a Generic Write Interrupt Count (GWIC) register to control the number of PCI device-generated TNet interrupt packets. The GWIC register is writable from both TNet and PCI; the value written to the register is additive (i.e. writing a value of 10 hex to the register when it already contains 20 hex will result in a GWIC register value of 30 hex). A write of zero to the GWIC register resets the register to zero. Read accesses to the GWIC register return the current value of the register.

Data Channel Allocation

Data channels may be allocated from either a TNet host, a PCI host, or a PCI device by accessing Colorado's Data Channel Request (DCR) register (see Section 11.9.3). When this register is read and a channel is available, Colorado returns a twelve-bit channel number for the allocated channel. If the DCR register is read when all data channels are already allocated, the register read is returned with the DCI (Data Channel Invalid) bit set to indicate that a data channel could not be allocated for this request.

Data Channel Initialization

Colorado's data channel hardware does not initialize the external memory used for DCC entries; however, at power-on Colorado's external memory interface initializes all Colorado local memory to all zeroes. As a result, all data channels default to the disabled state (DCE=0 in the Control field of the DCC) after a power-on condition. A data channel reset condition (initiated by setting the RESET bit in the Data Channel Control register) does not re-initialize any data channel context entries in memory.

Transfer Initiation

Before a data transfer is initiated, the following fields must be initialized by a TNet host, PCI host, or PCI device. Note that DCC fields other than the Control field should be modified only when the data channel is disabled (DCE=0 in the Control field of the DCC).

The TNet Destination Node ID and TNet Destination Path Select fields must be initialized to indicate the destination node for the data channel transfer.

The Mode bits in the Control field must be initialized to indicate whether the data channel is to be used in Data, Interrupt, or Serialized Interrupt mode.

If TNet interrupt packets are to be generated by Colorado for data channel-generated interrupt conditions, or if the data channel is in Interrupt or Serialized Interrupt mode, the TNet Interrupt Destination Node ID, TNet Interrupt Destination Path Select, and TNet Interrupt Address fields must be initialized to indicate the node and TNet address for data channel interrupt packets.

The Interrupt Enable field must be initialized to indicate which conditions produce data channel interrupts. In addition, if any interrupts are to be generated by the data channel, the IFMT bit in the Control field must be initialized to indicate the format of interrupt information generated by the data channel.

The PAC bit in the Control field must be initialized to indicate whether or not the data channel should perform PCI device access checking. If PCI access checking is enabled, the PCI Device Number field must also be initialized to indicate the PCI device allowed access to the data channel.

If this data channel is to be used or high-priority data transfers, the Preemptive Priority (PRE) bit in the Data Channel Control field of the DCC must be set.

For read operations through the data channel, the maximum number of pre-fetch buffers (PDBs to be utilized must be set in the Max PDBs field of the DCC).

Once the DCC fields described above are initialized, a data transfer may be initiated using this data channel once the following steps are taken:

The Write Outstanding Request (WOR) Counter, Read Outstanding Request (ROR) Counter, Current Buffer (CBuf) Pointer, Buffers Valid (BVal) Counter, and Status fields of the DCC must all be initialized to zero.

The Start/Current Address field of the DCC must be initialized to indicate the 64-byte (naturally-aligned) page within the data channel's virtual TNet space that contains the starting address for the data transfer. Node that the data transfer itself does not have to begin on a 64-byte boundary, it only needs to begin within the 64-byte page specified by the Start/Current Address field.

The End Address field of the DCC must be initialized to indicate the last byte address for the data transfer within the data channel's virtual TNet space.

The TNet Address Translation field of the DCC must be initialized to map the data channel's virtual TNet address space into the destination node's TNet address space.

Finally, the data channel must be enabled by setting the Data Channel Enable (DCE) bit in the Control field of the DCC.

Transfer Interruption

A data channel read or write transfer in progress can be terminated by resetting the DCE bit in the DCC's Control field, in effect disabling the data channel. Before the data channel can be reprogrammed for a new operation, there must NOT be any outstanding requests remaining. This check can be done by polling the RO bit in the DCC's Status field for a 0 value. RO=1 indicates that there are still outstanding DCE requests.

Transfer Completion

When a PCI write occurs that references the byte contained in the End Address field of the data channel's DCC (and the Transfer End Check Disable (TECD) bit in the Control field of the DCC is set to zero). Colorado completes the data transfer by performing the following steps:

Colorado waits for all outstanding write requests associated with the data channel to complete.

If the Interrupt Enable field indicates that a data channel interrupt is to be generated on a data channel transfer completion. Colorado generates the specified interrupt (based on the setting of the IFMT bit in the Control field of the DCC).

Colorado disables the data channel by clearing the Data Channel Enable (DCE) bit in the Data Channel Control field of the DCC.

If a PCI write access is attempted beyond the End Address specified in the DCC of a data channel, and the TECD bit in the Control field of the DCC is set to zero, Colorado sets the AERR bit in the Status field of the DCC for that channel and places the data channel in the error state.

The concept of a PCI read transfer completion condition does not exist for Colorado, since the DCE logic can not determine when a PCI device receives data read from Colorado (for example, there may be PCI-toPCI bridges between Colorado and the device).

Data Channel Reprogramming

An allocated data channel may be reused for as many data transfers as needed; data channels do NOT need to be allocated and deallocated on a per-transfer basis. Assuming that the destination node, interrupt generation profiles, and channel priority remain constant for all data transfers utilizing the data channel, new data transfers can be initiated by repeating the procedure in Section 13.8, Transfer Initiation above.

If the destination node, types of interrupts to be generated, or channel priority need to be changed between transfers, the procedure in Section 13.7, Data Channel Initialization must also be performed while the data channel is disabled.

Data Channel Deallocation

A TNet host, PCI host, or PCI device may deallocate a data channel by writing the Data Channel Deallocation (DCD) register (see Section 11.9.4) with the number of the data channel to be deallocated. When the DCD register is written with a data channel number, Colorado returns the deallocated data channel to an internal pool of unallocated data channels (i.e. the appropriate bit in the Data Channel Allocation Map is reset). Colorado does not verify that the entity deallocating the data channel is the same one that originally allocated the data channel; this allows third-party deallocation of channels for error recovery conditions.

There has been described a peripheral control interface having a plurality of data channels which can initiate multiple data streams or transactions simultaneously to a host processor or to other remote nodes. By scheduling read transactions ahead of time for the most recently active requestors so that read data is already present in the local end node where it is being requested, the read latency over the system area network can be eliminated entirely for subsequent read transactions, thereby greatly improving overall system performance. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A peripheral control interconnect (PCI) for connecting a plurality of peripheral devices to end nodes in a system area network (SAN) through a system fabric of routers, comprising:

an I/O bus shared by a plurality of devices;

a plurality of data channel engines for simultaneous processing of data requests for reading and writing data through a plurality of virtual data channels;

a local memory for storing accessed data; and control means for assigning virtual data channels to system access requests and for storing requested data in a local memory.

2. The peripheral control interconnect as defined by claim 1, wherein control and status information for a virtual data channel is maintained in a data channel context stored in the local memory.

3. The peripheral control interconnect as defined by claim 2, wherein the data channel context includes a number of outstanding requests by a user to whom the virtual data channel is allocated.

4. The peripheral control interconnect as defined by claim 3, wherein a data channel engine responds to the outstanding requests by pre-fetching data for storage in the local memory.

5. The peripheral control interconnect as defined by claim 1, wherein a requesting peripheral is instructed to retry a transaction request until the requested data is available in the local memory thereby freeing the I/O bus for transactions of other peripheral devices.

6. The peripheral control interconnect as defined by claim 5, wherein each virtual data channel is 512 k bytes with 4096 virtual data channels defined in 2 gigabytes of the local memory.

7. The peripheral control interconnect as defined in claim 6, wherein a peripheral device is provided with an address in the system area network by mapping a virtual buffer address which is combined with a PCI address.

8. The peripheral control interconnect as defined in claim 7, wherein a PCI address associated with any of the data requests includes a based field indicative of a virtual data channel access and equals a value for a virtual buffer base address register, a channel number field indicative of an allocated virtual data channel, and an offset field which specifies an exact address within the allocated virtual data channel.

9. The peripheral control interconnect as defined in claim 1, wherein each virtual data channel is 512 k bytes with 4096 virtual data channels defined in 2 gigabytes of the local memory.

10. The peripheral control interconnect as defined in claim 1, wherein a peripheral device is provided with an address in the system area network by mapping a virtual buffer address which is combined with a PCI address.

11. The peripheral control interconnect as defined in claim 1, wherein a PCI address associated with any of the data requests includes a based field indicative of a virtual data channel access and equals a value for a virtual buffer base address register, a channel number field indicative of an allocated virtual data channel, and an offset field which specifies an exact address within the allocated virtual data channel.

12. A method for transmitting data in a peripheral control interconnect (PCI) for coupling a plurality of peripheral devices to end nodes in a system area network through a system fabric of routers, comprising the steps of:

providing a bus which is shared by a plurality of peripheral devices;

defining a plurality of virtual data channels in a local memory for use in assigned data transfers;

providing a plurality of data channel engines for simultaneously processing data requests for reading and writing data through virtual data channels;

assigning virtual data channels to specific system access requests; and storing requested data in a local memory.

13. The method as defined by claim 12, wherein providing the plurality of data channel engines includes storing in memory control and status information for a data channel, the information including the number of outstanding requests by a peripheral user to whom the data channel engine is allocated.

14. The method as defined by claim 12, wherein in providing the plurality of data channel engines a data channel engine responds to outstanding requests by pre-fetching data for storage in the local memory.

15. The method as defined by claim 12, wherein a requesting peripheral is instructed to retry a transaction request until the requested data is available in the local memory thereby freeing the I/O bus for transactions of other peripheral devices.

16. The method as defined by claim 12, wherein assigning the virtual data channels includes providing a peripheral device with addresses in the system are network by mapping a virtual buffer address which is combined with a PCI address.

17. The method as defined by claim 12, wherein a PCI address associated with any of the data requests includes a based field indicative of a virtual data channel access and equals a value for a virtual buffer base address register, a channel number field indicative of an allocated virtual data channel, and an offset field which specifies an exact address within the allocated virtual data channel.

18. The method as defined by claim 12, wherein providing the plurality of data channel engines includes programming each of them with a context for read pre-fetch operations.

19. The PCI as recited in claim 1, wherein each of the plurality of data channel engines is programmable with a context for read pre-fetch operations.

20. The PCI as recited in claim 1, wherein each of the plurality of data channel engines includes a read pre-fetch engine configured to generate read request packets to be stored in the local memory.

21. A method for handling data transactions in a peripheral control interconnect (PCI) that couples a plurality of peripheral devices to end nodes in a system area network through a system fabric of routers, the plurality of peripheral devices being connected to a bus, comprising:

receiving a read request from one of the peripheral devices;

accessing a local memory to fetch requested data in response to the read request from that peripheral device; and if the requested data is not present in the local memory,
assigning one of a plurality of virtual data channels to that peripheral device,
instructing that peripheral device to relinquish the bus and retry the read request later so that meanwhile other peripheral devices can have access to the PCI through the bus,
fetching the requested data from the system area network through the assigned virtual data channel, and
storing the fetched requested data in the local memory for use by that peripheral device.

22. The method as recited in claim 21, wherein read request transactions are scheduled ahead of time for most recently active of the plurality of peripheral devices.

23. The method of claim 21, wherein 4096 virtual data channels can be assigned for supporting the data transactions.

24. The method of claim 21, wherein the number at any point in time of assigned virtual data channels is configurable.

25. A peripheral control interconnect (PCI) for supporting data transactions between peripheral devices and end nodes in a system area network, the peripheral devices being connected to a bus, comprising:

means for receiving the data transactions, including a read request, from the peripheral devices;

means for accessing a local memory to fetch requested data in response to the read request from one of the peripheral devices; and if the requested data is not present in the local memory,
means for assigning one of a plurality of virtual data channels to that peripheral device,
means for instructing that peripheral device to relinquish the bus and retry the read request later so that meanwhile other peripheral devices can have access to the PCI through the bus,
means for fetching the requested data from the system area network through the assigned virtual data channel, and
means for storing the fetched requested data in the local memory for use by that peripheral device.

26. A peripheral control interconnect (PCI) for supporting data transfer transactions between peripheral devices and end nodes in a system area network, the peripheral devices being connected to a bus, comprising:

a plurality of ports which the PCI is capable of using simultaneously for data transfers, each port allowing data transfer in a particular direction;

an access validation and translation unit which, in regards to each data transfer, the PCI is capable of using for access validation and address translation;

a block transfer mechanism for generating data transfers including read and write transactions; and data channel engines providing virtual data channels for data streams via the PCI.

27. The system of claim 26 in which each data channel engine includes a read pre-fetch engine for pre-fetching data.

28. The system of claim 27, further comprising:

a local memory in which pre-fetched data is stored.

29. The system of claim 26 in which the number of the virtual data channels is configurable.

30. The system of claim 26 in which each data channel engine includes a mechanism for assigning a distinguishable virtual channel to each data stream.

* * * * *